United States Patent

[11] 3,578,902

[72] Inventor John Monsay
Malvern, Pa.
[21] Appl. No. 755,895
[22] Filed Aug. 28, 1968
[45] Patented May 18, 1971
[73] Assignee RCA Corporation

[54] APPARATUS FOR SYNCHRONIZED GENERATION OF A SIGNAL FROM A COMPOSITE COLOR VIDEO SIGNAL SUBJECTED TO SIGNAL PERTURBATIONS
3 Claims, 2 Drawing Figs.

[52] U.S. Cl. .......... 178/5.4, 178/69.5
[51] Int. Cl. .......... H04n 5/44, H041 7/00
[50] Field of Search .......... 178/69.5 (CB), 5.45 (PNC); 331/10

[56] References Cited

UNITED STATES PATENTS

| | | | |
|---|---|---|---|
| 3,495,033 | 2/1970 | Sato et al. .......... | 178/6.6A |
| 2,924,650 | 2/1960 | Rennick .......... | 178/69.5CB |
| 3,395,360 | 7/1968 | Smeulers .......... | 331/10 |

*Primary Examiner*—Robert L. Griffin
*Assistant Examiner*—Donald E. Stout
*Attorney*—Edward J. Norton

ABSTRACT: A technique is disclosed for providing a local reference signal in response to a composite color video signal. The frequency and phase of the reference signal are determined by certain signal portions of the composite signal. The nominal frequency of the reference signal is made to conform to a multiple of the horizontal synchronizing signal frequency portion of the composite signal. The reference signal is further influenced by the presence of the color burst signal portion of the composite signal, to synchronize the reference signal in phase and frequency to the burst signal.

PATENTED MAY 18 1971 3,578,902

INVENTOR
JOHN MONSAY
BY Edward J Norton
ATTORNEY

APPARATUS FOR SYNCHRONIZED GENERATION OF A SIGNAL FROM A COMPOSITE COLOR VIDEO SIGNAL SUBJECTED TO SIGNAL PERTURBATIONS

This invention relates to a technique for producing a local reference signal in response to a composite video signal, the phase and frequency of the reference signal being determined by certain signal portions of the composite signal. The invention finds particular utility in applications where such a reference signal is to be produced in response to a composite video signal which has been recorded and reproduced in a video tape recorder system.

In the art of processing color video signals, each horizontal video line contains in addition to the luminance signal, a chroma signal and a color burst signal, both of which appear in the vicinity of 3.58 megacycles. It is common in the art to recover the color information, by comparing the relative phase of the transmitted chroma signal to a source of 3.58 megacycles which is locally generated. This local signal is locked in phase and frequency to the burst signal transmitted in the composite video signal. It is the phase difference between the chroma signal and the color burst signal that determines the resultant color hue. The local signal is usually obtained by providing an oscillator, whose phase and frequency is made to conform to that of the color burst when it is present. In color television receivers the oscillator is usually a crystal oscillator. A crystal oscillator restricts the possible operating frequencies of the oscillator, and thus minimizes the chance of side-locking the oscillator to a frequency removed from the burst frequency. Such a system is satisfactory where the burst information is subject to little distortion or variation. However in video recorders, certain undesirable variations and distortions may be introduced in the process of recording and reproducing the video information. In addition, the reference frequency for playback in the recorder is often the 60 cycle power line, which is not highly stable. These factors require the local reference oscillator to be capable of following a much wider range of frequencies.

Approaches in the past have included, providing an oscillator which is initially manually adjusted to a frequency close to the expected recorded frequency of the burst signal. Then under the influential presence of the burst signal, the oscillator output signal phase and frequency will conform to that of the burst. Problems arise however, where due to the record-reproduce process the burst signal is modified. This is particularly true in tape recorders operating in slow motion or still scan modes, where there is a change in relative record-reproduce head to tape speed. This may prevent synchronization of the oscillator and the burst information. Alternatively, synchronization may occur, but due to the short duration of the burst signal other errors are possible. That is, following the influential presence of the burst, the oscillator while maintaining the burst phase is free to oscillate at its natural frequency. If that frequency is appreciably different from the desired burst frequency, then during the absence of the burst signal, an accumulated phase error will result in the output of the reference oscillator. This phase error will cause distortion in the subsequent color demodulation process.

Other approaches have utilized control loops, to lock the reference oscillator frequency to the burst frequency. These approaches must contend with the inherent $15.7^{+}$ KC sideband content of the burst signal. This sideband content is difficult to remove and may cause undesirable side locking.

Still further approaches have utilized some additional reference signal, which is recorded with the normal video signal information, to serve ultimately as the local reference signal. Such additional signals, if not properly controlled, may cause undesired interference in the final video information. Furthermore, such a scheme lacks compatibility with recorders which do not use such a scheme to record the video information.

It is accordingly an object of the present invention, to provide a system capable of synchronously generating a local reference signal having desired phase and frequency characteristics in response to a composite video signal, in spite of perturbations experienced by the composite video signal.

In accordance with the principles of the present invention, the color burst signal and horizontal synchronizing signals are separated from a composite color video signal. A signal is generated in response to the horizontal synchronizing signal, whose frequency is a multiple of the frequency of the horizontal synchronizing signal. This generated signal is such as to permit synchronization with the phase and frequency of the color burst signal, and minimization of accumulated phase error between burst signal intervals.

Figure 1:
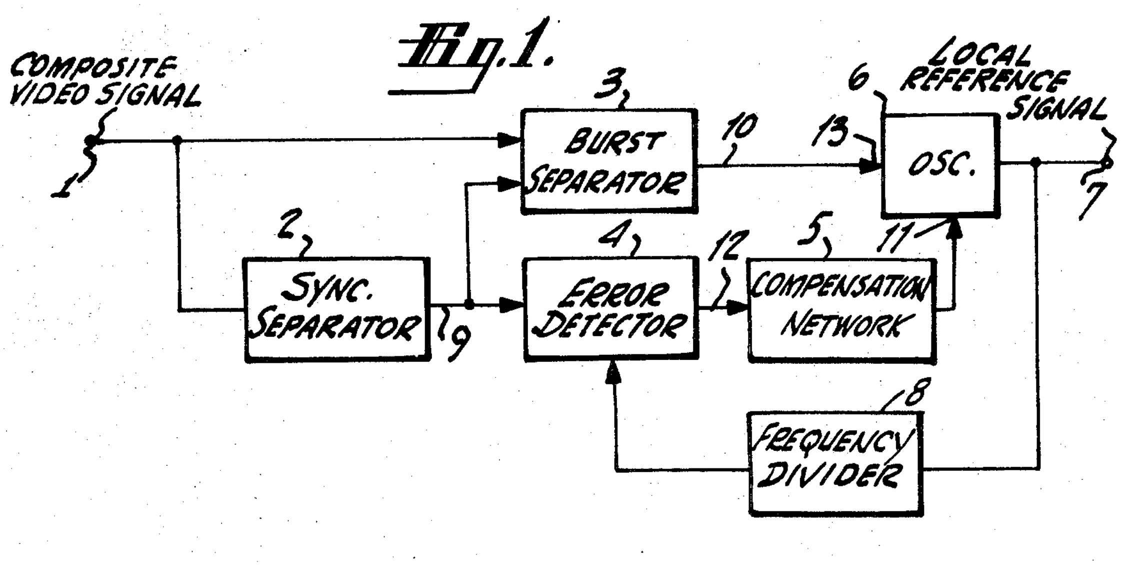
FIG. 1 is a diagram in block form, of a system for producing a reference signal in response to a composite video signal according to the present invention.

If reference is made to FIG. 1, there is shown a terminal 1 to which is applied a composite video signal. The composite signal includes a horizontal synchronizing signal, and a color burst signal. The color burst signal comprises several cycles of approximately 3.58 mc. on the "back porch" or trailing portion of the horizontal synchronizing signals. The composite signal is coupled to the input of a sync separator circuit 2 and also to the input of a burst separator 3. The output of the sync separator 2 is also connected to a first input of an error detector 4. The output of the error detector 4 is coupled through a compensation network 5 to one input of an oscillator 6. The output of the burst separator 3 is connected to a second input of the oscillator 6. The output of oscillator 6, which is the local reference signal, appears at terminal 7. The output of the oscillator 6 is also coupled to the input of a frequency divider 8. The output of the frequency divider 8 is connected to a record input of the error detector 4. In operation, the sync separator 2, removes the horizontal synchronizing signals from the composite signal, and produces these horizontal signals as an output on lead 9. These horizontal signals are used as a timing signal in the burst separator 3. In the burst separator 3, the horizontal sync signals provide keying information for gating out of the composite signal the burst signal, which follows the trailing edge of the horizontal sync signals by a known period. The separated burst signal is thus available on lead 10. The oscillator 6, frequency divider 8, error detector 4, and compensation network 5 comprise a frequency control loop. The oscillator 6 is preferably of the voltage control type, wherein the nominal output frequency of the oscillator is determined by the control voltage present at the input terminal 11. The action of the frequency control lop causes the output of the oscillator 6 to be a multiple of the horizontal sync signal frequency. The multiple is chosen such that the output frequency of the oscillator is approximately 3.58 mc., which is substantially equal to the nominal frequency of the burst signal. This oscillator frequency is established by dividing down the output frequency of the oscillator in the frequency divider 8, to a value which is suitable for comparison to the pulse repetition frequency of the horizontal sync signal. For example the divider 8 may be a divide by 455, which produces an output whose frequency is nominally one-half that of the horizontal sync signal frequency. Several devices are known in the art for frequency division such as a series of interconnected flip-flop circuits. The output of the divider 8 which forms one input to the error detector 4, is compared with the frequency of the horizontal sync signal which is the second input to the detector 4. The error detector 4 is preferably a phase error detector capable of discerning small frequency differences, which are known in the art. Where the divider 8 is a divide by 455, the frequency output of the divider 8 is compared with every other horizontal synchronizing pulse. The resultant error voltage on lead 12 is fed through a compensation network 5, which provides a continuous frequency control signal to terminal 11 of the oscillator. The compensation network 5 for example may be a conventional resistance-capacitance lag-lead filter network. The network 5 provides noise filtering, and adjustment of gain and phase for stable operation of the closed loop frequency control. The network 5 also includes a means such as a conventional sample and hold circuit, to provide a continuous control voltage to the oscillator 6 between sampling intervals of the error detector 4.

Returning to the operation of the oscillator 6 it is to be noted that the burst signal on lead 10 is available at terminal 13. Coupling is provided between terminal 13 and the "tank circuit" or frequency determining network of the oscillator 6. This coupling arrangement results in the oscillator 6 frequency and phase being pulled or synchronized to that of the burst signal. The theory and details of injecting a signal into an oscillator for synchronization are well known in the art and therefore need not be discussed here. This pull-in synchronization is possible, since the oscillator has been forced to operate at a frequency at or very near the burst signal frequency, by the action of the frequency control loop. Although the burst signal may have been subjected to perturbations such as in the record-reproduce operation of a video recorder, the horizontal synchronizing signal will also have experienced essentially the same perturbations so synchronization is still possible. Even where the burst signal experiences slightly different perturbation than the horizontal synchronizing signal, it has been observed that the action of the frequency control loop of the oscillator will position the oscillator frequency sufficiently close to that of the burst signal to enable synchronization.

The arrangement of the present invention permits generation and synchronization of a local reference signal in phase and frequency to the color burst signal, even where the burst signal has been subjected to perturbation. Such perturbations are commonly encountered in video recording particularly in slow-motion or still scan modes of recorder operation. It is also to be noted that the burst signal is present for only a relatively short period of time, and therefore can only directly influence the oscillator 6 output during its presence. That is, the burst will cause the oscillator output to conform in phase and frequency during the burst interval. However following the burst signal, while the oscillator will maintain the phase of the burst signal, it is free to oscillate at a frequency determined by the oscillator parameters. If this frequency is appreciably different from the burst signal frequency, an accumulated phase error will occur during the interval before the next burst signal. Again such frequency differences can occur in a video tape recorder, where the resultant alteration of the burst signal frequency may not be capable of precise prediction for all circumstances. With the arrangement of the present invention, accumulated phase error is minimized, since following the burst signal, the oscillator is forced by the frequency control loop to oscillate at a frequency which is identical to or at least substantially equal to that of the burst signal.

Figure 2:
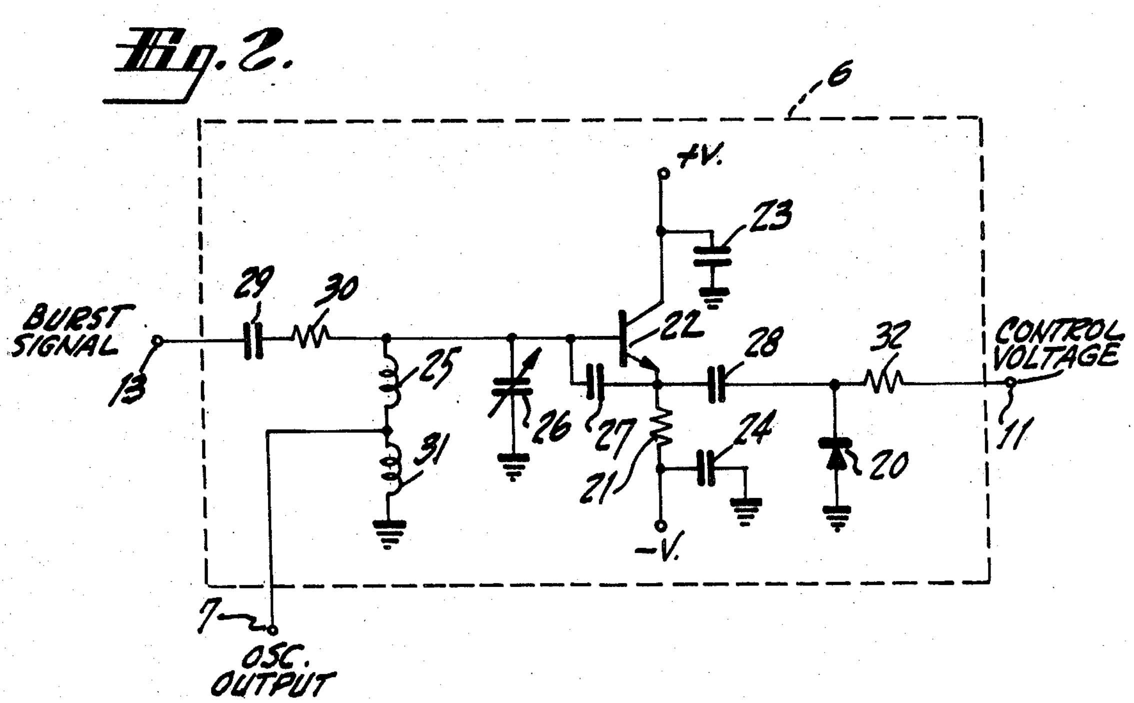
FIG. 2 is a schematic diagram of a phase and frequency controllable oscillator according to the present invention.

If reference is made to FIG. 2, there is shown an embodiment of an oscillator which is suitable for use in the arrangement of FIG. 1. The oscillator of FIG. 2 is basically a Colpitts type oscillator, with a voltage variable capacitance element 20 such as a varactor diode. The voltages +v. and −v., in conjunction with the resistor 21, establish the proper bias conditions for the transistor 22 to operate as an oscillator. The capacitors 23 and 24 provide RF bypass for the bias voltages +v. and −v. The nominal frequency of oscillation is determined by the values of the inductance 25, variable capacitance 26, capacitance 27 and the capacitance of the controlled capacitance element 20. The capacitance 26 is initially adjusted for oscillation at approximately 3.58 mc., which corresponds to the midrange of the variable capacitance element 20. The frequency of oscillation is thereafter controlled by the voltage at terminal 11, which is applied to element 20 to vary the frequency determining capacitance of the oscillator. The control voltage is coupled through the resistance 32, to prevent loading down of the oscillator by the source of control voltage. A capacitance 28 is also provided to isolate the control voltage from the bias voltages ±v. The burst signal which is made available at terminal 13, is coupled through a capacitance 29 and resistance 30. The capacitance 29 provides DC isolation between the oscillator and the burst signal source. Resistance 30 enables coupling of the desired amount of burst signal energy to the oscillator tuned circuit, and prevents loading down of the oscillator by the burst signal source. The application of the burst signal to the oscillatory determining circuit comprising elements 25, 26, 27 and 20, results in the frequency and phase of oscillation being conformed to or synchronized with those of the burst signal. Following the occurrence of the burst signal, the oscillations continue at the same phase as the burst signal, and at the frequency determined by the parameters of elements 25, 26, 27 and 20. This frequency is made to be at or close to the burst frequency by the control voltage at terminal 11. Thus the resultant frequency variation, and hence accumulated phase error, until the presence of the next burst signal, is minimized. The oscillator output signal is taken across an isolation inductance 31 and is available on terminal 7.

I claim:

1. Apparatus for providing in response to a composite color video signal, which has been subjected to signal perturbations, an output signal which is synchronized in phase and frequency with the color burst and horizontal sync signal portions of said composite video signal, comprising: means for separating said horizontal synchronizing signal portion from said composite signal; means for separating said burst signal from said composite signal; a signal generator having control means for establishing an operating frequency of said generator in response to a first signal applied to one input thereof, said generator including means responsive to the presence of a further signal at a second input thereof causing the output signal of said generator to be conformed in phase and frequency to said further signal; means responsive to said burst signal for providing said further signal to the second input of said generator; and frequency difference determining means coupled to the output of said generator and responsive to the frequency of said horizontal synchronizing signal portion for providing said first signal input to said generator, said first signal being such as to establish the operating frequency of said generator at a value enabling the generator output to be conformed in phase and frequency to said burst signal and maintained close to the frequency of said burst signal in the absence of said burst signal, regardless of perturbations of said composite video signal.

2. In combination with a system for recording and reproducing a composite color video signal, wherein said composite signal including frequency related color burst and horizontal synchronizing signal portions are subjected to common perturbations by virtue of said recording and reproducing process, apparatus for providing and maintaining a continuous local color reference signal having the phase and frequency of said reproduced burst signal in the presence of said perturbations, comprising: first means for separating the reproduced horizontal synchronizing signal portion of said composite signal as modified by said perturbations; second means for separating the reproduced color burst signal portion of said composite signal as modified by said perturbations; an oscillator with first and second inputs and an output and having a frequency determining network including a voltage controlled tuned means, said oscillator providing an output frequency established by a signal applied through said first input to said voltage controlled tuned means, and synchronized in phase and frequency in the presence of a further signal applied through said second input to said frequency determining network; means for applying said modified color burst signal portion to the second input of said oscillator; frequency divider means coupled to said oscillator output for providing a submultiple frequency of said oscillator output signal; phase detector means coupled to the output of said divider means and said first means, for providing to said first input of said oscillator a continuous signal whose magnitude is indicative of the deviation of the output frequency of said oscillator from a multiple of said modified horizontal synchronizing signal, said first input signal establishing said oscillator output at a frequency multiple of said modified horizontal synchronizing signal portion which is approximately equal to the frequency of said modified color burst portion, to enable said oscillator output to be phase and frequency synchronized by the presence of said color burst portion, and maintained at said established frequency between the periodic occurrences of said color burst portion.

3. The invention as claimed in claim 1 wherein said frequency difference determining means includes:

a frequency divider circuit coupled to the output of said signal generator; and a phase error detector having a first input coupled to the output of said divider and a second input coupled to said horizontal synchronizing signal separator.